United States Patent
MacKinnon et al.

(10) Patent No.: US 8,379,509 B2
(45) Date of Patent: Feb. 19, 2013

(54) ELECTRONIC DEVICE PROTECTION SYSTEMS AND METHODS

(75) Inventors: Colin Murdo MacKinnon, Carp (CA); Nigel Montgomery, Kanata (CA); Randy Law, Surrey (CA); Patrick Boily, Port Coquitlam (CA)

(73) Assignee: Alcatel Lucent, Paris (FR)

( * ) Notice: Subject to any disclaimer, the term of this patent is extended or adjusted under 35 U.S.C. 154(b) by 1958 days.

(21) Appl. No.: 11/117,788

(22) Filed: Apr. 29, 2005

(65) Prior Publication Data

US 2005/0243712 A1 Nov. 3, 2005

Related U.S. Application Data

(60) Provisional application No. 60/566,481, filed on Apr. 29, 2004.

(51) Int. Cl.
*G01R 31/08* (2006.01)
(52) U.S. Cl. .......................... 370/216; 370/255
(58) Field of Classification Search .................. None
See application file for complete search history.

(56) References Cited

U.S. PATENT DOCUMENTS

| | | | |
|---|---|---|---|
| 5,831,970 A | 11/1998 | Arao et al. | |
| 6,151,330 A * | 11/2000 | Liberman | 370/449 |
| 6,198,721 B1 * | 3/2001 | Mueller | 370/223 |
| 6,433,988 B1 | 8/2002 | Lowe et al. | |
| 6,603,736 B1 | 8/2003 | Huber et al. | |
| 6,643,269 B1 * | 11/2003 | Fan et al. | 370/254 |
| 6,934,248 B1 * | 8/2005 | DeBoer et al. | 370/217 |
| 6,944,681 B1 * | 9/2005 | Christensen et al. | 710/8 |
| 6,956,816 B1 * | 10/2005 | Alexander et al. | 370/222 |
| 7,027,390 B2 * | 4/2006 | Wakai et al. | 370/218 |
| 7,170,851 B1 * | 1/2007 | Chen et al. | 370/222 |
| 7,450,497 B2 * | 11/2008 | Trudel et al. | 370/224 |
| 2002/0083365 A1 | 6/2002 | Labana | |
| 2005/0180410 A1 * | 8/2005 | Pepenella | 370/386 |

OTHER PUBLICATIONS

European Search Report with Annex, Sep. 8, 2005.

* cited by examiner

*Primary Examiner* — Kevin C Harper
*Assistant Examiner* — Rhonda Murphy
(74) *Attorney, Agent, or Firm* — Barnes & Thornburg LLP

(57) ABSTRACT

Protection systems and methods for electronic devices including at least one communication line interface are disclosed. A switch connected to each interface and a working communication path in an electronic device is adapted for connection to a protection communication path and controllable to connect each interface to either the working communication path or the protection communication path. Inter-device messaging provides for switch control by a protection device connected to the protection communication path, monitoring of devices in a protection group, protection communication path monitoring, and automatic configuration of a protection group.

17 Claims, 2 Drawing Sheets

ELECTRONIC DEVICE PROTECTION SYSTEMS AND METHODS

CROSS-REFERENCE TO RELATED APPLICATION

This application is related to and claims the benefit of U.S. Provisional Patent Application Ser. No. 60/566,481, filed on Apr. 29, 2004, and entitled "ELECTRONIC DEVICE PROTECTION SYSTEMS AND METHODS". The entire content of the provisional patent application, including specification and drawings, is incorporated into the present application by reference.

FIELD OF THE INVENTION

This invention relates generally to electronic devices and, in particular, to protection of such devices.

BACKGROUND

In so-called redundant protection systems, multiple electronic devices are provided in a protection group. For a 1:N protection scheme, for example, the protection group includes one protection device which protects N working devices. A protection device is normally substantially identical to the working devices which it protects, such that all working device functions are protected.

When a protected working device fails, a protection device takes over all protected functions of the working device. In a common arrangement for communication systems, for instance, communication lines which are normally connected to ports or interfaces on the working device are switched to the protection device. Such switching is traditionally accomplished using analog switching techniques and hardware such as relays, on a line side of the interfaces. For 1:N protection arrangements, multiple relays are required.

This approach may present a problem for multiple-interface devices having high interface densities (e.g., 32 interfaces) because of the number of signals, the spacing of analog signal lines required to meet safety and signal quality specifications, and in the case of 1:N or M:N arrangements, the number of relays required. Where the working and protection devices are circuit cards intended for deployment in an equipment rack, for example, in which device interconnections are provided on a backplane of the equipment rack, available physical space is limited, and may not be sufficient to accommodate appropriately spaced signal lines or multiple relays. Communication equipment such as switches or routers, for example, may include many line cards, each having multiple communication line interfaces.

In addition, relays tend to have high failure rates relative to integrated circuit switching components. Relying on relays to perform protection switching may thus be undesirable, especially if no means exist to verify that a switching operation is successful. As relays are also less deterministic than digital switches, accurate timing for switching operations is also difficult for relay-based protection schemes.

The overall operation of conventional protection arrangements or their subsystems is not typically monitored. For example, connections between a protection device and protected working devices are not checked for correct functioning before a protection switch is performed. If these connections are not functioning properly when a protection switching operation is required, then performing the switching operation will not have the desired effect of bringing a protection device into operation. Therefore, these connections represent a potential point of failure in conventional protection arrangements. Verification that a switching operation was successful may also be desirable.

SUMMARY OF THE INVENTION

Embodiments of the invention enable protection switching for multiple-interface electronic devices using a protection communication path connecting devices in a protection group.

In a preferred embodiment, a switch which is connected between communication line interfaces and a working communication path in a working electronic device and also connected to a protection communication path is controllable to connect the interfaces to either the working communication path or the protection communication path.

According to one aspect of the invention, an electronic device is provided, and includes at least one communication line interface, a working communication path, and a switch connected to each interface and the working communication path and for connection to a protection communication path. The switch is controllable to connect each interface to either the working communication path or the protection communication path.

The electronic device may be a circuit card or an adapter card, for example. In the latter case, the working communication path may be connected to a service card or other device for processing interface signals received or to be transmitted through each interface.

In one embodiment, the switch is controllable to independently connect each of a plurality of interfaces to either the working communication path or the protection communication path.

The switch may be controllable by either the electronic device itself or a protection electronic device connected to the protection communication path. The electronic device may include or be connected through the working communication path to components configured to determine whether the protection device is connected to the protection path and operating, and to allow control of the switch by the protection device where the protection device is present and operating. Otherwise, control of the switch may be assumed by the electronic device or components. Switching operations for a switch controlled by the protection device may also be requested by the electronic device by sending a request to the protection device over the protection communication path.

An electronic device protection system is also provided. The system includes a working electronic device having an interface, working device components, and a switch connected between the interface and the working device components, a protection electronic device having protection device components for protecting the working device the working device switch and the protection device. The protection device is configured to control the working device switch to connect the working device interface to the protection device components through the protection communication path or to the working device components.

The protection device may determine whether the working device components are operating, and to control the working device switch to connect the working device interface to the protection device components through the protection communication path where the working device components are not operating. This determination may be made, for instance, by periodically sending messages to the working device through the protection communication path and determining whether a response to each message is received from the working device within a predetermined response time interval.

The protection path itself may also be monitored by the protection device by controlling the working device switch to loop back the protection communication path and sending a test message to the working device through the communication path.

In another embodiment, the working device is configured to determine whether the protection device is operating and to control the working device switch to connect the working device interface to the working device components where the protection device is not operating.

Such a protection system may include multiple working devices and multiple protection devices.

According to a further embodiment of the invention, the protection device detects a further working device connected to the protection communication path, and assumes control of a switch of the further working device. For example, the protection device may be configured to detect the further working device by periodically sending messages to each of a number of addressable locations on the protection communication path at which a working device may be connected, and determining whether a message response is received from a working device connected to the protection communication path at each of the locations. The addressable locations may be respectively associated with a sequence of identifiers, in which case the protection device may be further configured to send a message to an addressable location associated with an identifier responsive to receiving a response to a message sent to an addressable location associated with a preceding identifier in the sequence of identifiers. Slot numbers in an electronic equipment rack represent one example of such a sequence of identifiers.

A protection switching method is also provided for a protection group comprising working electronic devices and a protection electronic device. The working electronic devices and the protection electronic device include respective switches connected in a protection communication path. The method includes sending a message from the protection device to a working device on the protection communication path, determining whether a protection switching operation is to be performed, based on the message, and controlling a switch in the working device to connect working device signals to the protection device through the protection communication path or to a working communication path in the working device where a protection switching operation is to be performed.

The method may also include sending a response to the message from the working device to the protection device. Where the message comprises an identifier of the working device and control information, determining may involve determining whether the control information comprises a switching command, and controlling the switch to perform the switching command. The message may also include verification information, and if so, determining may involve determining whether the message is valid based on the verification information. If a message is not valid, the switch may be controlled to connect the working device signals to the working communication path in the working device.

In another embodiment, the message sending operation includes periodically sending messages to the working device, and determining includes detecting that a message has not been received at the working device within a predetermined time interval. The switch may then be controlled to connect the working device signals to the working communication path in the working device responsive to the detecting.

According to yet another aspect of the invention, a method of monitoring a protection group including a protection electronic device connected to a protection communication path is provided. The method includes sending a message to an addressable location selected from a sequence of addressable locations on the protection communication path at which working electronic devices may be connected and determining whether a message response is received from a working device connected to the protection communication path at the addressable location. Where a response is received, the method also includes adding the working device connected to the protection communication path at the addressable location to the protection group, selecting a next address in the sequence of addressable locations, and repeating the steps of sending and determining. Otherwise, the protection group is ended at a previous addressable location in the sequence of addressable locations.

Other aspects and features of embodiments of the present invention will become apparent to those ordinarily skilled in the art upon review of the following description of the specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
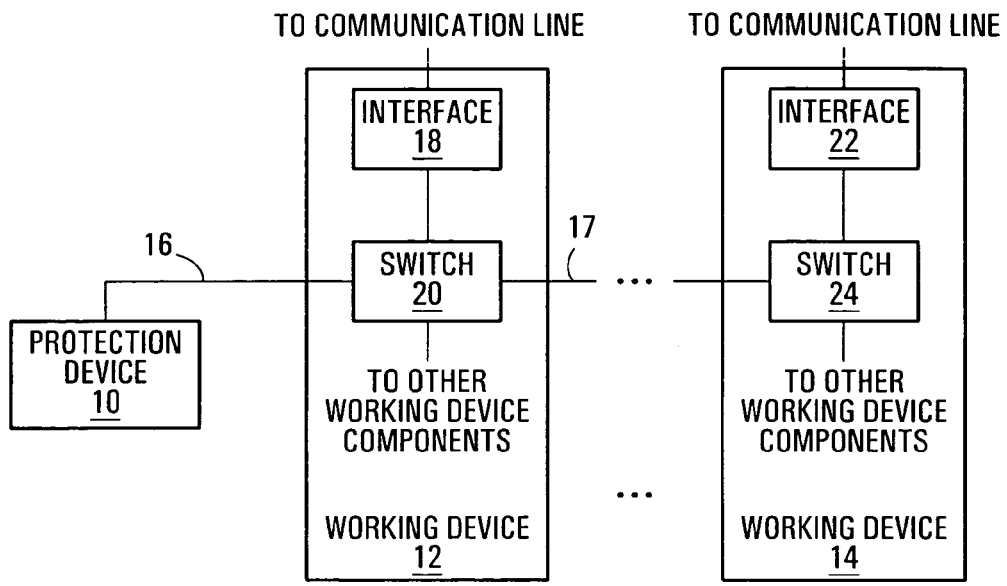
FIG. 1 is a block diagram of a system in accordance with an embodiment of the invention.

FIG. 1 is a block diagram of a system in accordance with an embodiment of the invention. It should be appreciated that the system shown in FIG. 1, as well as the contents of the other Figures, is presented solely for illustrative purposes, and that the invention is in no way limited thereto.

The system of FIG. 1 includes a protection device 10 and working devices 12, 14 which form a protection group. Although only one protection device 10 and two working devices 12, 14 are explicitly shown in FIG. 1, embodiments of the invention may be implemented to provide for 1:1, generally referred to as 1+1, 1:N, or M:N protection arrangements. A protection communication path, sections of which are designated 16, 17 in FIG. 1, connects the protection device 10 and the working devices 12, 14 in a protection group. Each working device 12, 14 includes a communication line interface 18, 22 and a switch 20, 24.

The protection device 10 is preferably substantially identical to the working devices 12, 14 and provides protection for at least some of the functions of the working devices 12, 14. In the system of FIG. 1, working device functions supported by components on a communication line side of the switches 20, 24 are not protected by the protection device 10. The protection device 10 does not include a communication line interface and as such, functions of the interfaces 18, 22 are not protected in the particular illustrative embodiment of the invention shown in FIG. 1. It should be appreciated, however, that different levels of protection may be provided in other embodiments of the invention by changing the location of the protection communication path switches 20, 24.

In a preferred embodiment, the protection device 10 protects all working device functions associated with working device components on a device side of the switches 20, 24. The protection device 10 therefore preferably includes at least components which are substantially identical to the other working device components generally labelled in FIG. 1 on a device side of the switches 20, 24. As the protection device 10 may support additional functions, such as monitoring the protection path 16, 17 and the working devices 12, 14 as described in further detail below, the protection device 10 may also include further components or be configured somewhat differently than the working devices 12, 14. According to one embodiment, the protection device 10 and the working devices 12, 14 incorporate identical hardware but are configured differently, using different operating software, for example. This type of embodiment allows a single hardware device to be configured as a protection device or a working device.

Those skilled in the art will appreciate that the working devices 12, 14 may be any of many different types of device. In one embodiment, the working devices 12, 14 are line cards for communication equipment such as a communication switch or router.

The interfaces 18, 22 enable the working devices 12, 14 to send, receive, or both send and receive communication signals over respective communication lines. Such interfaces are commonly also referred to as ports or lines, and references to interfaces herein should be interpreted accordingly.

The type of the interfaces 18, 22 provided in the working devices 12, 14 may be dependent upon such factors as the type of the working device 12, 14, the type of communication line to which the working device 12, 14 is to be connected, and the communication protocols to be supported. Although each working device 12, 14 in a protection group preferably includes the same type of interface 18, 22, it should be appreciated that different working devices 12, 14 may include different types of interface. For example, a device or multiple devices in a protection group may include interfaces compatible with such communication standards as T1 and OC3 or DS3. Other compatible interface types which may potentially be provided in a device or in different devices within a protection group may be apparent to those skilled in the art.

In some embodiments, each working device 12, 14 includes multiple interfaces 18, 22, preferably of the same type but possibly of different types. According to one embodiment of the invention, each working device 12, 14 includes one or more interfaces compatible with T1 or E1 communication lines. A device may also include protected and unprotected interfaces.

The functions of the interfaces 18, 22 vary depending upon the type of interface. Each interface 18, 22 may perform additional functions beyond merely providing a physical component such as a backplane connector for connection to a communication line. These additional functions preferably include at least a conversion function for converting between analog signals on a line side of the interfaces 18, 22 and digital signals on a device side of the interfaces 18, 22. Such conversion enables protection switching to be accomplished using digital switches, which tend to be more reliable than relays and analog protection switching techniques used in conventional protection arrangements.

The switches 20, 24 provide multiple switching functions. Under normal operating conditions, the switches 20, 24 connect the interfaces 18, 22 to other components of the working device 12, 14 through a device or working communication path. As described above, embodiments of the invention may be implemented in conjunction with many different types of working devices 12, 14. Thus, the components of the working devices 12, 14 and the functions performed thereby are dependent upon the type of the working devices 12, 14. Protection switching in accordance with embodiments of the invention is substantially independent of the particular working device functions for which protection is provided.

When a working device failure is detected, by the protection device 10 in one embodiment of the invention described in further detail below, the switch 20, 24 in that working device 12, 14 connects the interface 18, 22 of the device to the protection device 10 through the protection communication path 16, 17.

The switch 20, being connected in the protection communication path 16, 17 between the working device 14 and the protection device 10, also connects the communication path sections 16, 17. Where the other working device 14 fails, the interface 22 is thereby connected to the protection device 10 through the working device 12.

In a "last" or terminal working device of a protection group, the working device 14 in FIG. 1, a switch need not provide this switch-through function. The protection path 16, 17 ends at the working device 14. However, in order to provide for protection path monitoring, the switch 24 may provide a loopback function, to effectively reflect or transmit signals received on the protection path 16, 17 back toward the protection device 10 on the protection path 16, 17.

Therefore, the switches 20 and 24 may be implemented using different components, as intermediate and terminal working devices on a protection communication path may perform different protection switching functions. However, a dynamic protection arrangement may be provided by using a common switch structure in all working devices 12, 14. For example, if the switch 24 in the working device 14 also supports the above switch-through function, then further working devices may be added to a protection group without requiring hardware changes to other working devices in the protection group. Similarly, support for the protection path loopback function in the switch 20 allows the working device 12, or any other intermediate working device, to loop back the protection path and thus behave as a terminal working device in the event that a working device is removed from the protection group. Thus, each working device 12, 14 may include the same type of switch, which may be configured or controlled in different ways for intermediate and terminal working devices.

It should also be appreciated that the switches 20, 24 may provide further switching functions in addition to protection switching functions, such as communication line loopback and equipment loopback on the device communication path, for instance.

As described above, the interfaces 18, 22 preferably provide for conversion between analog signals on a line side and digital signals on a device side thereof. This conversion enables implementation of the switches 20, 24 as digital switches. In a dynamic protection arrangement, configurable switching components such as Field Programmable Gate Arrays (FPGAs) may be preferred as the switches 20, 24. Other suitable types of controllable and possibly configurable switches will be apparent to those skilled in the art.

The protection communication path 16, 17 may include such components as physical interfaces or connectors on the protection device 10 and each working device 12, 14, and a communication medium therebetween. Where the devices are circuit cards, for example, the protection communication 10, 12, 14 and conductors on a backplane.

Since the working devices 12, 14 in a protection group share the same protection communication path 16, 17, the total number of conductors for protection systems according to embodiments of the invention is substantially reduced in comparison with conventional protection systems. Where analog and digital conversion is provided by the interfaces 18, 22, physical space requirements are further reduced, as digital signal lines do not require the same spacing as analog signal lines. In addition, providing the switches 20, 24 on the working devices 12, 14 also eliminates the need for external protection switching components which are typically provided on an equipment rack backplane. Data associated with multiple interfaces may also be multiplexed into a single digital data stream on the protection communication path 16, 17, further reducing the number of signal lines used in a protection system.

In a preferred embodiment of the invention, the protection communication path includes a data path and a control path. The data path provides for connection of the interfaces 18, 22 to the protection device 10, and the control path provides for monitoring and control of a protection group as described in further detail below. Separate data and control paths allow monitoring and control operations to be performed by the protection device 10, for example, even when the protection device is "active" or in a protection state, after a working device 12, 14 has failed and its interface 18, 22 is connected to the protection device 10.

The system of FIG. 1 provides a protection switch architecture which protects the working devices 12, 14. The shared protection communication path 16, 17 makes the protection of devices with high interface or port densities feasible even where physical space constraints exist.

According to a preferred embodiment, the protection device 10 acts as a master device in the protection group and controls protection switching. The protection device 10 monitors the status of the protected working devices 12, 14, and initiates a protection switching operation when a working device failure is detected. The operational health of the working devices 12, 14 may be monitored, for example, using a control messaging scheme on the protection communication path 16, 17, as described in further detail below. Interface signals for the interface 18, 22 of a failed working device 12, 14 are switched from a normal working communication path of the working device 12, 14 to the protection communication path 16, 17, which is connected to the protection device 10.

Protection switching may also be initiated, for example, in response to a request from a working device 12, 14. Other components, such as a control card for equipment in which a protection system is implemented, may be configured to detect working device faults or errors and request protection switching. Manual initiation of protection switching may also be supported, during system upgrades, for instance.

If the protection group is functional, as determined by the protection device 10 through monitoring, the protection device 10 performs a protection switching operation when monitored conditions or requests from other devices or components indicate that such a switch is necessary. As described in further detail below, the working devices 12, 14 may also monitor the protection device 10, and automatically revert to a normal operating state after a protection switching operation if a problem with the protection card 10 is detected. Although the switches 20, 24 may be primarily controlled by the protection device 10 in some embodiments, a control override for the working devices 12, 14 may be provided.

Protection group and protection path monitoring are described in further detail below, with reference to a control messaging scheme.

Figure 2:
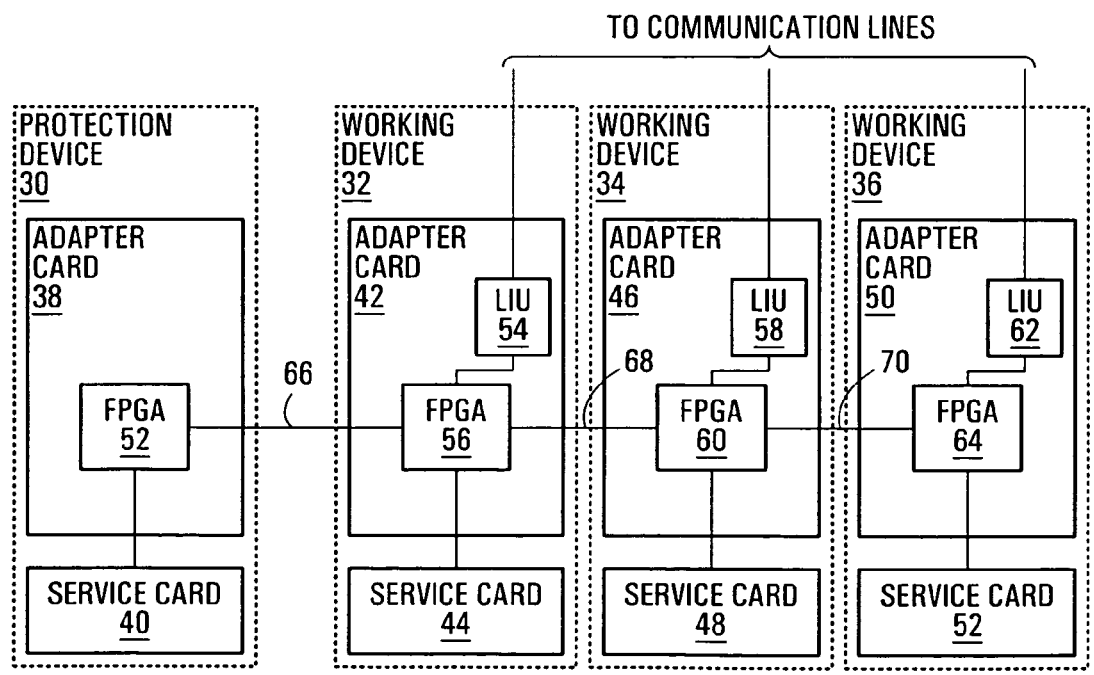
FIG. 2 is a block diagram of a system in accordance with a further embodiment of the invention.

FIG. 2 is a block diagram of a system in accordance with a further embodiment of the invention. As described above with reference to FIG. 1, the invention is in no way limited to the particular embodiment shown in FIG. 2. Other embodiments may include further, fewer, or different components with different interconnections than explicitly shown in FIG. 2.

The system of FIG. 2 is substantially similar to the system of FIG. 1, in that it includes a protection device 30 and a plurality of working devices 32, 34, 36 connected by a protection communication path having sections 66, 68, 70. However, each of the devices 30, 32, 34, 36 in FIG. 2 includes an adapter card 38, 42, 46, 50 and a service card 40, 44, 48, 52. It will therefore be apparent that a device 30, 32, 34, 36 may include multiple electronic devices. In one sense, each adapter card 38, 42, 46, 50 may be considered an electronic device in the context of the present application.

Each of the working adapter cards 42, 46, 50 includes a line interface unit (LIU) 54, 58, 62 and an FPGA 56, 60, 64. The LIUs 54, 58, 62 perform such functions as analog and digital conversion, clock recovery, and encoding and decoding, for example. In one embodiment, each adapter card 42, 46, 50 includes 4 LIUs, each handling 8 communication lines, to provide a 32-interface device. The FPGAs 56, 60, 64 are configurable digital switching devices. The adapter cards 42, 46, 50 therefore represent one example implementation of the interfaces 18, 22 and the switches 20, 24 of FIG. 1. Those skilled in the art will be familiar with examples of LIUs and FPGAs and their operation.

The LIUs 54, 58, 62 are on an unprotected line side of the protection communication path 66, 68, 70 and are therefore not protected in the system of FIG. 2. Thus, the protection adapter card 38 might not include an LIU. Alternatively, an LIU may be provided in the adapter card 38 but not configured for operation when an adapter card is used in a protection device. From the above description of FIG. 1, it will be apparent that the protection adapter card 38 need not necessarily include the FPGA 52. However, the FPGA 52 may provide for switch-through functionality to support addition of further protection devices (for an M:N protection arrangement) and possibly working devices in the protection group, loopback of the protection communication path 66, 68, 70 at the protection device end, and equipment loopback for the service card 40, for example. As described in further detail below, the FPGAs may also perform messaging and control operations and provide protection group status information to service cards.

In the system of FIG. 2, the working service cards 44, 48, 52 are protected by a substantially identical service card 40. The service cards 40, 44, 48, 52 may provide any of a multitude of different functions for processing signals received or to be transmitted on communication lines through the adapter cards 42, 46, 50.

The overall operation of the system of FIG. 2 is substantially similar to that of FIG. 1. The protection device 30 preferably monitors the protected working devices 32, 34, 36, and controls the FPGAs 56, 60, 64 to perform protection switching operations.

Figure 3:
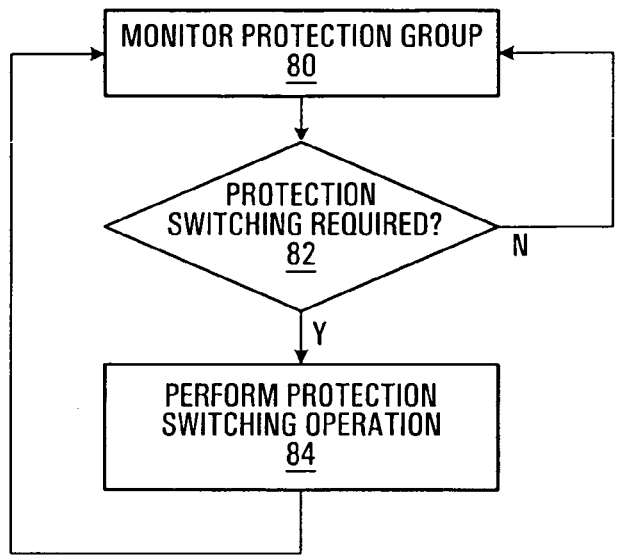
FIG. 3 is a flow diagram of a method according to an embodiment of the invention.

FIG. 3 is a flow diagram of a method according to an embodiment of the invention. When a protection group has been established, the group is monitored at 80. As will be described in further detail below, monitoring at 80 may involve monitoring of the entire group by a device, such as a protection device, or monitoring of only some devices by other devices. In the latter case, working devices may monitor a protection device, for example.

Where a protection switch is required, as determined at 82, such as in response to monitored conditions or an explicit request, a protection switching operation is performed at 84. Protection switching is preferably controlled by a protection device, although working device overrides may also be provided. Monitoring is resumed at 80 after a protection switching operation is completed at 84, and the success or failure of the protection switching operation can thus be determined. Monitoring also continues at 80 when protection switching is not required.

Those skilled in the art will appreciate that the invention is not restricted to the method as shown in FIG. 3. Protection switching methods in accordance with embodiments of the invention may further or different operations, performed in a different order than shown in FIG. 3.

Further embodiments of the invention relate to protection switch messaging between devices in a protection group, such as between a master protection device and slave working devices. Inter-device messaging may increase the reliability of protection switching operations by providing for monitoring of protection communication paths, devices, and functions. A protection data path, a protection control path, operation of protection devices, and protection switchover success or failure may be monitored or determined based on messaging schemes in accordance with embodiments of the invention. In conventional protection switching systems, interface status is unknown until a protection switching operation is attempted.

In one embodiment, inter-device messaging is controlled primarily by a master device, preferably a protection device, in a protection group. Messages are sent by the master device to slave devices, preferably the working devices, when protection switching operations are to be performed.

The messages may include destination information, control information, and a checksum or other verification information, which is used by a destination device to detect message corruption. In a control message which causes a switching operation at a slave device, the control information includes a command or command code, for example, which is processed at the slave device. In one embodiment, commands include protection switching commands to set or clear protection modes and commands to set or clear protection communication path loopbacks. Protection switching commands control the activity state of a device. In an active state, working device interfaces are connected to the working device communication path, whereas in an inactive state or protection mode, the working device interfaces are connected to a protection device through the protection communication path.

Upon reception and verification of a control message from the master device by a slave device, a response message indicating the identity of the slave device, response information, and a checksum for message corruption detection is preferably generated and sent to the master device. The response information preferably includes a value or data pattern indicating that the message is a response message. Where a response message is acknowledging a command message, the command or command code from the command message being acknowledged may also be included in the response message.

Response messages provide a mechanism using which a master device verifies that a control message has been received by an intended slave device. A response message may also be used to indicate that a switching operation was successful, where the slave device is configured to generate the response message after a commanded switching operation has been performed, for instance.

In another embodiment, the master device verifies that the switching operation was successful by determining a state of a switch in the slave device. As those skilled in the art will appreciate, the state of the FPGAs 56, 60, 64 shown in FIG. 2 may be determined by the protection device 10 by accessing FPGA registers. Other switch state detection schemes may also be used, depending upon the type of switches implemented at protected working devices, for example.

Error or failure processing, such as re-trying a command message or declaring a failure of a working device, may be performed when a switching operation is not successful or no response is received within a predetermined response time period.

In accordance with a preferred embodiment of the invention, the master device also periodically sends messages across the protection communication path to each slave device in a protection group. Such monitor messages do not invoke a protection switching function at a slave device, but provide for monitoring of the protection communication path and the protection group. Although monitor messages may have a similar format to control messages, including an identity or address of a destination device, control information, and a checksum, the control information is preferably set to a predetermined value or data pattern indicating that the message is a monitor message.

A response message, generated by a slave device when a monitor message identifying that slave device as the destination device is received, provides an indication to the master device that the slave device is present. A common response message format is preferably used for responding to control messages and monitor messages. However, the content of response information may be different for control response messages and monitor response messages. For example, response information in a control response message may indicate a particular command or command code being acknowledged.

Monitor response messages are preferably tracked at the master device, such as by using registers at the master device. In the event that a response message is not received from a destination slave device within a response time interval, then the master device may declare a slave device failure, and, for example, reconfigure the protection group to exclude the failed device.

Periodic monitor messages also allow slave devices to monitor the sanity of the master device, and thus determine whether protection switching functions for subsequent command messages from the master device should be executed or ignored. Command messages might be ignored, for example, after a predetermined number of corrupted or invalid monitor messages are received from the master device. As described above, a checksum or other verification information may be included in monitor messages and used by a slave device to detect message corruption.

In one embodiment of the invention, devices in a protection group are associated with indicators or addresses stored at the master device during configuration of a protection group. The master device periodically sends respective monitor messages to each slave device in the protection group and determines whether a response message is received within a response time period.

Figure 4:
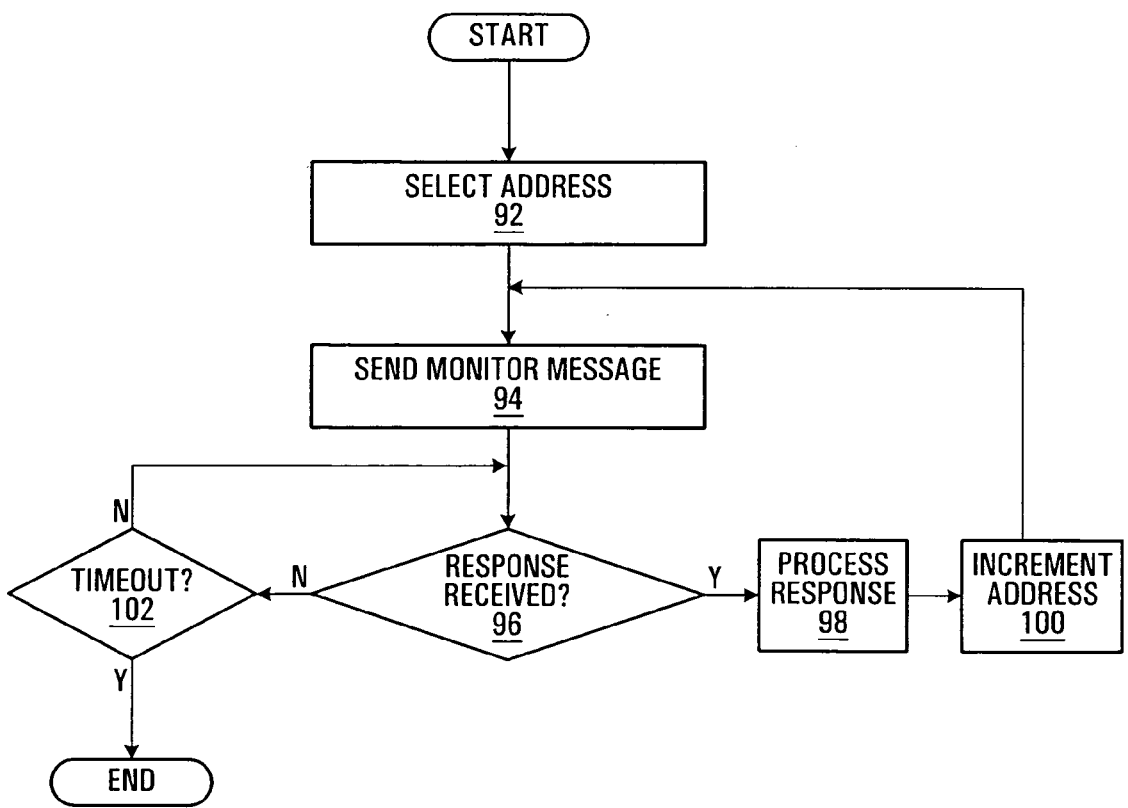
FIG. 4 is a flow diagram of a method in accordance with another embodiment of the invention.

According to a preferred embodiment, devices in a protection group may be associated with any of a number of predetermined addresses. This type of arrangement provides for expansion of a protection group subsequent to initial deployment. In an equipment rack, for example, cards may be located within any of a number of slots which are addressable by slot number. A protection device may then send monitor messages to each slot number, in sequence, and await a response message from a device located in each slot. FIG. 4 is a flow diagram of a method according to such an embodiment.

At 92, a master device selects an address for a monitor message, and sends a monitor message to that address at 94. The selected address is preferably the address of a first slave device, closest to the master device, in the protection group. The master device then awaits a response message from a device at the selected address, and if a response message is detected at 96, the response message is processed at 98, to update registers at the master device for instance. A next address, such as a next slot, is selected at 100 and a monitor message is sent to that address 94.

These operations are repeated until the master device detects a response timeout. If a response timeout is detected at 102, indicating that no response message was received within a response time interval, then a current monitoring cycle ends. Monitoring cycles are preferably performed periodically by a master device.

The method of FIG. 4 provides for protection group monitoring as described above, by determining whether each slave device responds to the master device in a timely fashion. In one embodiment, a monitor message is generated at an interval of every 6 ms and sent to a selected address, and the response time interval is 50 microseconds. Different monitor message and response time intervals may be used in other embodiments. The response time interval preferably accounts for more than a maximum trip delay between a master and a terminal slave device.

Automatic protection group detection is also enabled by the method of FIG. 4. When a response message is received, the master device sends a monitor message to a next slave device, or a next location at which a slave device might be installed. The addition or removal of slave devices may thus be detected by the master device. Protection group configuration is then dynamic, and adjusts to any changes in installed devices.

Consider, for example, an arrangement of devices in an equipment rack, including a master protection device in slot 4, and slave working devices in slots 5, 6, and 8, with the above monitor message interval of 6 ms. At time t=0, the protection device sends a monitor message to slot 5 and receives a response within a response time interval. Similarly, at time t=6 ms, the protection device sends a monitor message to slot 6 and receives a response within the response time interval. At time t=12 ms, the protection device sends a monitor message to slot 7 but does not receive any response within the response time interval. This marks the end of the protection communication path and thus the protection group at slot 6.

If a working device is added to slot 7, then this may be detected during a subsequent monitoring cycle to effectively extend the protection group to include the devices in slots 7 and 8. The next monitoring cycle may begin at the next monitor message interval, at t=18 ms in the above example, so that the master device sends monitor messages substantially continuously at periodic intervals. Monitoring cycles may instead operate with a different period than monitor messaging.

It should be appreciated that embodiments of the invention do not require that all devices implemented in a system belong to a protection group. A communication switch, for example, may include both protected devices, in one or more protection groups, and unprotected devices. In the above example, if the working device installed in slot 7 is not configured for protection switching control, then it may simply ignore the monitor message, and the protection group ends at slot 6.

In the event of a protection communication path failure or some other occurrence such as a card pull which changes a protection group, a slave device that was formerly part of a protection group detects that it has not received a monitor message within one or more monitor message cycle times, illustratively within 500 ms. The device may then revert to a non-protection configuration, in which it assumes control of its own switching operations. If the device was in a protection state, then its interfaces are preferably connected to the working device communication path if possible. This auto-revert feature also ensures that a slave device reverts to normal operation if a master device fails. Upon protection group restoration to include the device, the device is re-configured as a protected device within the protection group.

The protection communication path may also be used to transfer other types of messages than the control, monitor, and response messages described above. For example, where a switching operation may be requested by a slave device, request messages including an indication of a requested switching operation or command may be sent by slave devices to the master device. In another embodiment, the protection communication path is used as a general purpose communications path between multiple devices for relaying statistical information directly between devices, for instance.

Protection communication path loopback functionality at slave devices permits further monitoring of a protection communication path, using Bit Error Rate Test (BERT) techniques, for example. After a switch in a terminal slave device at a far end of a protection communication path has been set to a protection communication path loopback state by the master device, the integrity of the protection communication path can be tested by sending a test signal or data pattern to the protection communication path. Each device in the protection communication path receives the test signal, may perform some processing on the signal, and passes the signal to a next device in the protection communication signal path. At the terminal device, the test signal is looped back and travels in an opposite direction back to the master device.

The returned signal is then processed at the master device to determine whether a number of errors introduced into the test signal during transmission along the protection communication path exceeds a predetermined threshold. The master device may also confirm whether the test signal was processed by all of the slave devices in the protection group, by accessing identifiers added to the test signal by each device as it passes the signal to the next device or a hop counter incremented by each device, for instance. It should be appreciated, however, that in some embodiments, devices pass but might not process the test signal. The absence of a return signal within a predetermined time window is also indicative of an error or failure at some point along the protection communication path.

Those skilled in the art will appreciate that the operations described above may be supported in many different ways for different types of device. For devices such as those shown in FIG. 2, for example, functions may be performed by the adapter cards, the service cards, or divided between those components, depending upon the functions or components to be monitored or controlled. If monitoring messages are used in making protection switching decisions, then monitoring response message generation preferably involves at least some operations performed by protected equipment. In this case, receipt of a valid monitor response message by a master device indicates that protected equipment is present and operating at a slave device. It should also be appreciated that any of these functions and operations may be supported, entirely or in part, by software executed by protection and working devices.

Many different implementations for the protection communication path will also be apparent. In one embodiment, a protection communication path uses 6 signal lines between neighbouring devices, with 2 lines being configured to carry an enable signal indicating the presence of valid data on the remaining 4 lines. The 4 lines then carry one nibble of data at a time to transfer messages along the protection communication path. The 2 enable lines may be used to respectively indicate the presence of valid data being transmitted in different directions between devices.

A further advantage of some embodiments of the invention is that a protected working device is kept in synchronization with the status of its interfaces in case an auto-revert occurs. Since protection switching according to en-odiments of the invention is accomplished through a switch on a working device, the working device has up to date connection information, even while in an inactive or protected state. Where an FPGA is used as a switch, for example, the working device may also monitor protection status in the FPGA to determine whether protection has been relinquished by the protection device. In the event of a switch back or auto-revert, a working device need only enable its working communication path interfaces, as all connections are already active.

What has been described is merely illustrative of the application of principles of the invention. Other arrangements and methods can be implemented by those skilled in the art without departing from the present invention.

For example, although described above primarily in the context of equipment protection, the techniques disclosed herein may also be used to provide per-interface protection, in conjunction with suitably configured switches.

In addition, more than one protection device may be provided in a protection group. One of the protection devices is preferably designated as a master, and controls switching operations of both protection devices and working devices. The protection communication path for such embodiments may include multiple paths, one per protection device for example. Alternatively, multiplexing on a single protection communication path may enable transfer of signals to more than one protection device.

More than one protection group may also be provided in electronic equipment. Where suitable switches are provided, a working device may be part of more than one protection group.

The foregoing description relates primarily to protection switching operations performed when a protected device is to assume a protection state, in which a protection device effectively takes over operations from the working device. It should be appreciated that the above monitoring and control operations may also be used to clear a protection state, whereby a failed working device resumes normal operations after a fault or failure has been corrected.

We claim:

1. An electronic device protection system comprising:
a working electronic device having an interface, working electronic device components, and a working electronic device switch connected between the interface and the working electronic device components;
a protection electronic device having protection electronic device components for protecting the working electronic device components; and
a protection communication path connecting the working electronic device switch and the protection electronic device,
wherein the protection electronic device is configured to control the working electronic device switch to connect the working electronic device interface, through the working electronic device switch, either to the protection electronic device components through the protection communication path or to the working electronic device components,
wherein the protection electronic device is further configured for sending a message to an addressable location selected from a sequence of addressable locations on a protection communication path, determining whether a message response is received from a further working electronic device connected to the protection communication path at the addressable location, adding the further working electronic device connected to the protection communication path at the addressable location to the protection group and repeating the sending and the determining for a next addressable location in the sequence of addressable locations where a message response is received, and ending the protection group at a previous addressable location in the sequence of addressable locations where a message response is not received.

2. The system of claim 1, wherein the at least one working electronic device interface comprises a plurality of interfaces, and wherein the working electronic device switch is controllable to independently connect each of the plurality of interfaces to either the working electronic device components or the protection communication path.

3. The system of claim 1, wherein the working electronic device switch is further controllable to connect the working electronic device components to the protection communication path.

4. The system of claim 1, wherein the protection communication path comprises protection communication path sections, and wherein the working electronic device switch is connected to the protection communication path sections and controllable by the protection electronic device to connect the protection communication path sections.

5. The system of claim 1, wherein the protection electronic device comprises a switch connected between the protection communication path and the protection electronic device components and configured to control the working electronic device switch.

6. The system of claim 5, wherein the protection electronic device is further configured to determine whether the working electronic device components are operating, and to control the working electronic device switch to connect the working electronic device interface to the protection electronic device components through the protection communication path where the working electronic device components are not operating.

7. The system of claim 6, wherein the protection electronic device is configured to determine whether the working electronic device components are operating by periodically sending messages to the working electronic device through the protection communication path and determining whether a response to each message is received from the working electronic device within a predetermined response time interval.

8. The system of claim 1, wherein the working electronic device switch is further controllable by the protection electronic device to loop back the protection communication path, and wherein the protection electronic device is further configured to monitor the protection communication path by controlling the working electronic device switch to loop back the protection communication path and sending a test message to the working electronic device through the protection communication path.

9. The system of claim 1, wherein the working electronic device is configured to determine whether the protection electronic device is operating and to control the working electronic device switch to connect the working electronic device interface to the working electronic device components where the protection electronic device is not operating.

10. The system of claim 1, comprising:
- a plurality of working electronic devices including the working electronic device and at least one further working electronic device, each of the plurality of working electronic devices having an interface, working electronic device components, and a working electronic device switch connected in the protection communication path and between the interface and the working electronic device components; and
- a plurality of protection electronic devices including the protection electronic device, each of the plurality of protection electronic devices having protection electronic device components for protecting the working electronic device components and a switch connected between the protection communication path and the protection electronic device components.

11. The system of claim 1, wherein the protection electronic device is further configured to control a switch of the further working electronic device where a message response is received.

12. The system of claim 11, wherein the sequence of addressable locations is respectively associated with a sequence of identifiers, and wherein the protection electronic device is further configured to send a message to an addressable location associated with an identifier responsive to receiving a response to a message sent to an addressable location associated with a preceding identifier in the sequence of identifiers.

13. Electronic equipment comprising the system of claim 1.

14. Electronic equipment comprising a plurality of systems as defined in claim 1, the plurality of systems defining respective protection groups.

15. The system of claim 1, wherein the protection electronic device is configured to control the working electronic device switch to connect the working electronic device interface, through the working electronic device switch, to the protection electronic device components where a protection switching operation is to be performed, and to verify that the protection switching operation was successful.

16. The system of claim 1, wherein the protection electronic device is further configured to receive a request for a switching operation of the working electronic device switch, and to control the working electronic device switch based on the request.

17. A method of monitoring a protection group including a protection electronic device connected to a protection communication path, the method comprising:
- sending a message to an addressable location selected from a sequence of addressable locations on the protection communication path;
- determining whether a message response is received from a working electronic device connected to the protection communication path at the addressable location;
- where a response is received:
  - adding the working electronic device connected to the protection communication path at the addressable location to the protection group;
  - selecting a next addressable location in the sequence of addressable locations; and
  - repeating the steps of sending and determining; and
- ending the protection group at a previous addressable location in the sequence of addressable locations where a message response is not received from a working electronic device connected to the protection communication path at the addressable location.

* * * * *